(12) United States Patent
Matsuyama

(10) Patent No.: US 8,082,082 B2
(45) Date of Patent: Dec. 20, 2011

(54) ENGINE-LOAD CONTROL DEVICE FOR WORKING VEHICLE

(75) Inventor: Nobuo Matsuyama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 888 days.

(21) Appl. No.: 12/093,931

(22) PCT Filed: Dec. 4, 2006

(86) PCT No.: PCT/JP2006/324144
§ 371 (c)(1),
(2), (4) Date: May 15, 2008

(87) PCT Pub. No.: WO2007/066602
PCT Pub. Date: Jun. 14, 2007

(65) Prior Publication Data
US 2009/0163318 A1    Jun. 25, 2009

(30) Foreign Application Priority Data
Dec. 9, 2005  (JP) ................ 2005-356816

(51) Int. Cl.
*G06F 7/70*  (2006.01)
(52) U.S. Cl. .......................... 701/50; 477/68
(58) Field of Classification Search ............ 701/50; 477/68
See application file for complete search history.

(56) References Cited

U.S. PATENT DOCUMENTS

| | | | |
|---|---|---|---|
| 4,503,928 A * | 3/1985 | Mallen-Herrero et al. ... | 180/308 |
| 4,537,029 A | 8/1985 | Gunda et al. | |
| 4,606,313 A | 8/1986 | Izumi et al. | |
| 5,878,721 A | 3/1999 | Nakamura | |
| 5,996,701 A | 12/1999 | Fukasawa et al. | |
| 6,122,848 A * | 9/2000 | Fukuda et al. ............ | 37/382 |
| 6,314,727 B1 | 11/2001 | Prabhu et al. | |
| 6,430,490 B1 * | 8/2002 | Watanabe et al. ......... | 701/50 |
| 6,478,714 B2 | 11/2002 | Onnen et al. | |

(Continued)

FOREIGN PATENT DOCUMENTS

CN 87 1 00122 A  7/1987

(Continued)

OTHER PUBLICATIONS

Office Action dated on Sep. 29, 2010 of the corresponding German Application No. 11 2006 003 119.8-14.

*Primary Examiner* — Thomas Will
*Assistant Examiner* — Joel F. Mitchell
(74) *Attorney, Agent, or Firm* — Global IP Counselors

(57) ABSTRACT

An engine load control device is adapted to a working vehicle in which output of an engine is transmitted to drive wheels and to hydraulic actuators including a working equipment hydraulic actuator via a plurality of variable capacity hydraulic pumps. The control device includes an engine speed detection unit that detects an engine speed, an instruction content detection unit that detects contents of instructions of a speed instruction device, a hydraulic pump load detection unit that detects load of at least one load detection hydraulic pump among the variable capacity hydraulic pumps, and an absorption torque control unit. The absorption torque control unit controls absorption torque of at least one control hydraulic pump other than the load detection hydraulic pump based on detection results of the engine speed detection unit, the instruction content detection unit, and the hydraulic pump load detection unit.

8 Claims, 9 Drawing Sheets

U.S. PATENT DOCUMENTS

| | | |
|---|---|---|
| 6,857,986 B2 * | 2/2005 | Ikari et al. ..................... 477/64 |
| 2001/0008068 A1 | 7/2001 | Ikari et al. |

FOREIGN PATENT DOCUMENTS

| | | |
|---|---|---|
| DE | 100 41 679 A1 | 3/2002 |
| DE | 698 16 915 T2 | 6/2004 |
| JP | 53-128001 A | 11/1978 |
| JP | 55-114726 U | 8/1980 |
| JP | 57-171042 A | 10/1982 |
| JP | 60-195338 A | 10/1985 |
| JP | 62-55664 U | 4/1987 |
| JP | 04-027784 A | 1/1992 |
| JP | 04-063975 A | 2/1992 |
| JP | 04-083906 A | 3/1992 |
| JP | 2514319 Y2 | 7/1996 |
| JP | 10-219733 A | 8/1998 |
| JP | 2001-280256 A | 10/2001 |
| JP | 2005-180259 A | 7/2005 |
| WO | WO 2005/052372 A1 | 6/2005 |
| WO | WO-2006/016653 A1 | 2/2006 |

* cited by examiner (a) POWER MODE: TABLE 1P

| ENG SPEED (rpm) | 800 | 880 | 900 | 920 | 930 |
|---|---|---|---|---|---|
| EPC OUTPUT CURRENT (mA) | 800 | 800 | 500 | 200 | 0 |

(b) ECONOMY MODE: TABLE 1E

| ENG SPEED (rpm) | 800 | 880 | 900 | 920 | 930 |
|---|---|---|---|---|---|
| EPC OUTPUT CURRENT (mA) | 800 | 800 | 500 | 350 | 350 |

(c) POWER MODE: TABLE 2P

| ENG SPEED (rpm) | 900 | 1400 |
|---|---|---|
| EPC OUTPUT CURRENT (mA) | 800 | 800 |

(d) ECONOMY MODE: TABLE 2E

| ENG SPEED (rpm) | 900 | 1400 |
|---|---|---|
| EPC OUTPUT CURRENT (mA) | 800 | 800 |

(e) POWER MODE: TABLE 3P

| EXTENT OF OPENING OF ACCELERATOR (%) | 0 | 38 |
|---|---|---|
| EPC OUTPUT CURRENT (mA) | 0 | 200 |

(f) ECONOMY MODE: TABLE 3E

| EXTENT OF OPENING OF ACCELERATOR (%) | 0 | 38 |
|---|---|---|
| EPC OUTPUT CURRENT (mA) | 350 | 350 |

(g) POWER MODE: TABLE 4P

| S/T OIL PRESSURE (kg/cm$^2$) | 0 | 80 |
|---|---|---|
| EPC OUTPUT CURRENT (mA) | 0 | 200 |

(h) ECONOMY MODE: TABLE 4E

| S/T OIL PRESSURE (kg/cm$^2$) | 0 | 80 |
|---|---|---|
| EPC OUTPUT CURRENT (mA) | 350 | 350 |

ENGINE-LOAD CONTROL DEVICE FOR WORKING VEHICLE

CROSS-REFERENCE TO RELATED APPLICATIONS

This U.S. National stage application claims priority under 35 U.S.C. §119(a) to Japanese Patent Application No. 2005-356816, filed in Japan on Dec. 9, 2005. The entire disclosure of Japanese Patent Application No. 2005-356816 is hereby incorporated herein by reference.

TECHNICAL FIELD

The present invention relates to an engine load control device for a working vehicle, and particularly relates to an engine load control device for a working vehicle where engine output is transmitted to drive wheels, and is transmitted to a number of hydraulic actuators including hydraulic actuators for working equipment via a number of variable capacity hydraulic pumps.

BACKGROUND ART

In the following, a wheel loader is described as a working vehicle. The engine of a wheel loader constitutes both a drive source for traveling and a drive source for working equipment. Namely, a vehicle travels as a result of engine output being transmitted to drive wheels via a torque converter. Further, various hydraulic pumps including hydraulic pumps for working equipment are driven by the engine. Various devices such as working equipment can then be driven via hydraulic actuators using the hydraulic pumps. Specifically, for example, a hydraulic oil pump for steering use is driven by the engine. Hydraulic oil emitted by the hydraulic pump for steering is then supplied to hydraulic cylinders for steering and a steering mechanism is driven. Further, a hydraulic loader pump is driven by the engine, hydraulic oil emitted from the hydraulic loader pump is supplied to a hydraulic loader cylinder and the loader is driven.

This wheel loader can use the output of a single engine in both driving for traveling and driving of various devices such as working equipment. The engine output that is capable of being used for traveling is therefore influenced by the size of the load on the working equipment.

For example, when the engine speed is a low idle speed (idling), the rise in engine torque with respect to an abrupt rise in hydraulic oil load slackens compared to when engine speed is high. However, when carrying out work where a high hydraulic load is suddenly applied such as when a loader lifts up a load while turning the steering wheel during idling, there are cases where it is difficult for the rise in engine torque to follow the abrupt rise in the hydraulic load and the engine therefore stops.

The engine output is also taken up by the working equipment and hydraulic loads for steering when the loader and the steering mechanism are operated while traveling. This means that it is only possible to use what remains of the engine output for the travel load. The response to accelerator operations by an operator therefore falls due to sufficient haulage power not being obtained or due to a long time being required to increase vehicle speed.

In the devices shown in Japanese utility model registration number 2514319 and Japanese Patent Publication Laid-open No. 10-219733, when the traveling side is subject to predetermined conditions, the pump capacity on the working equipment side is suppressed and the ability to travel is impeded.

DISCLOSURE OF INVENTION

With the devices of the related art described above, load is detected on a traveling side and hydraulic pumps are controlled to adopt this load on a working equipment side. Namely, load driven by an engine is divided into two types of load, load for a traveling side and load for a working equipment side (pump). The working equipment side is then controlled as a result of detecting conditions on the traveling side. However, various loads for driving various devices exist as loads on the engine in addition to the traveling load and the working equipment load. With conventional devices for controlling working equipment pumps that only take into consideration traveling load and working equipment load, there are cases where the capacity of the working equipment pump falls to a capacity lower than the required capacity. Further, with conventional devices there is the problem that only a slight amount of power remains for pumps other than working equipment pumps and the power for driving the pumps cannot be utilized effectively.

It is therefore wished to improve both traveling performance and work performance by achieving control in a more balanced manner taking into consideration the engine load of the vehicle as a whole.

The task of the present invention is therefore to more comprehensively understand engine load and carry out appropriate engine load control in a more balanced manner.

An engine load control device for a working vehicle of a first aspect of the invention is an engine load control device four a working vehicle in which output of an engine is transmitted to drive wheels and to a plurality of hydraulic actuators including a working equipment hydraulic actuator via a plurality of variable capacity hydraulic pumps with an engine speed being controlled by a speed instruction device. The control device is equipped with an engine speed detection unit configured and arranged to detect an engine speed, an instruction contents detection unit configured and arranged to detect contents of instructions of the speed instruction device, a hydraulic pump load detection unit configured and arranged to detect load of at least one load detection hydraulic pump among the variable capacity hydraulic pumps, and an absorption torque control unit. The absorption torque control unit is configured to control absorption torque of at least one control hydraulic pump among the variable capacity hydraulic pumps other than the load detection hydraulic pump based on detection results of the engine speed detection unit, the instruction contents detection unit, and the hydraulic pump load detection unit. The absorption torque control section includes a first fall rate determining section, a second fall rate determining section, a third fall rate determining section, a fourth fall rate determining section, a minimum fall rate selecting section, a maximum fall rate selecting section, and an absorption torque lowering section. The first fall rate determining section is configured to determine a first fall rate for lowering the absorption torque of the control hydraulic pump so that the engine speed does not become equal to or less than a second engine speed that is equal to or less than a prescribed low idle speed set for preventing the engine from stopping. The second fall rate determining section is configured to determine a second fall rate for lowering the absorption torque of the control hydraulic pump according to the engine speed. The third fall rate determining section is configured to determine a third fall rate for lowering the absorption torque of the control hydraulic pump according to the contents of the instructions for the engine speed. The fourth fall rate determining section is configured to determine a fourth fall rate for lowering the absorption torque of the control hydraulic pump according to the load of the load detection hydraulic pump. The minimum fall rate selecting section is configured to select a minimum fall rate among the second, third and fourth fall rates. The maximum fall rate selecting section is configured to select a largest fall rate between the first fall rate and the minimum fall rate. The absorption torque lowering section is configured to lower the absorption torque of the control hydraulic pump according to the fall rate selected by the maximum fall rate selecting section.

This control device detects an engine speed and the content of speed instructions such as accelerator opening etc., and detects load of at least one load detection hydraulic pump of a number of variable capacity hydraulic pumps. The absorption torque of at least one hydraulic pump other than the load detection hydraulic pumps is controlled based on the detection results.

Here, not just engine speed taken as traveling conditions, but also the content of speed instructions such as the extent of opening of an accelerator taken as the intent of an operator are added. The load of at least one hydraulic pump (load detection hydraulic pump) is then detected and the absorption torque of other hydraulic pumps (control hydraulic pumps) is controlled. This makes it possible to perform more appropriate control compared to conventional devices. It is therefore possible to use engine power effectively. For example, it is possible to ensure that power of working equipment does not fall excessively compared to the related art while preventing deterioration of travel performance.

With this control device, the first fall rate selection section decides the first fall rate in such a manner that the engine does not stop, i.e. so that the engine speed does not fall below a second engine speed less than or equal to a low idle speed. Further, the second, third, and fourth fall rates are decided by the second, third and fourth fall rate selection section according to the engine speed, content of engine speed instructions, and load of the load detection hydraulic pumps. The fall rate decides the extent to which the absorption torque of the control hydraulic pump becomes small and specifically is a control signal to the control hydraulic pump. Next, a minimum fall rate is selected from the second to fourth fall rates by the minimum fall rate selecting section. The larger fall rate of the first fall rate and the minimum fall rate are then selected by the maximum fall rate selecting section. The absorption torque of the control hydraulic pump can then be lowered according to a finally selected fall rate.

Here, the minimum fall rate of the second to fourth fall rates is selected. It is therefore possible to keep falls in power of the control hydraulic pump to a minimum. However, it is possible to keep falling of the work rate at the working equipment to a minimum when controlling absorption torque of the working equipment hydraulic pump. Further, the larger fall rate of the first fall rate and the minimum fall rate are selected. It is therefore possible to prevent the engine speed from going below a second engine speed less than or equal to the low idling speed and stopping of the engine can be avoided. Namely, the non-occurrence of engine stopping is given priority, and the absorption torque of the control hydraulic pump is lowered to the minimum range where the engine does not stop. It is therefore possible to prevent lowering of the work rate to as great an extent as possible.

With an engine load control device for a working vehicle of a second aspect of the invention, in the control device of the first aspect of the invention, the absorption torque control unit is configured to execute control processing for controlling the absorption torque when the engine speed is less than or equal to a first engine speed.

In regions where the engine speed is comparatively high, cases where it is necessary to consider falling in traveling performance due to working equipment-side loads are common. The control device controls absorption torque of the control hydraulic pump only when the engine speed is a first engine speed or less (for example, 1400 rpm or less). The control load therefore becomes light.

With the engine load control device of a working vehicle of a third aspect of the invention, at the control device of the first or second aspect of the invention, the absorption torque control unit is configured to control absorption torque of a working equipment hydraulic pump for driving the working equipment hydraulic actuator.

Here, the absorption torque of working equipment hydraulic pumps that typically handle the most substantial loads are controlled. This enables control of pumps that have the greatest influence on the traveling performance and lowering of the traveling performance can be rapidly restored.

With an engine load control device for a working vehicle of a fourth aspect of the invention, for the control device of any one of the first to third aspects of the invention, the hydraulic pump load detection unit is configured to detect discharge pressure of a steering hydraulic pump in order to drive a steering hydraulic actuator included in a steering mechanism.

Here, the discharge pressure (load) of the steering hydraulic pump is detected and the absorption torque of control hydraulic pumps such as the working equipment hydraulic pump etc. is controlled. The steering mechanism has a substantial influence on travel when this mechanism is not functioning. It is therefore possible to improve the travel performance by taking into consideration the load of the steering hydraulic pump in order to drive this steering mechanism and controlling the control hydraulic pump taking into consideration that the steering mechanism must always function.

With an engine load control device of a working vehicle according to a fifth aspect of the invention, in the control device of any one of the first to fourth aspects of the invention, the instruction contents detection unit is configured to detect an opening degree of the accelerator device.

The opening degree of the accelerator pedal etc. of the accelerator device that accurately denotes the intent of the operator is detected and the control hydraulic pump is controlled taking into consideration the extent to which the accelerator is open. Traveling can therefore be controlled in a faithful manner with regards to the intent of the operator.

With an engine load control device of a working vehicle of a sixth aspect of the invention, with the control device of the first aspect of the invention, the working mode determining unit configured to determine whether a working mode is set to a power mode giving priority to generating power or an economy mode giving priority to saving energy is provided. The absorption torque control unit is then configured to control a fall rate of the absorption torque of the control hydraulic pump according to the working mode.

With a vehicle capable of selecting power mode and economy mode as working modes, target engine speed differs with respect to, for example, the extent of opening of the accelerator. In this case, the absorption torque of the control hydraulic pump is controlled according to the operating mode and appropriate control can therefore be achieved.

With an engine load control device for a working vehicle of an seventh aspect of the invention, in the control device of the first aspect of the invention, the absorption torque control unit is configured to control absorption torque of a working equipment hydraulic pump for driving the working equipment hydraulic actuator and the absorption torque lowering section is configured to control maximum absorption torque of the working equipment hydraulic pump.

With an engine load control device for a working vehicle of a eighth aspect of the invention, in the control device of the first aspect of the invention, the absorption torque control unit is configured to control absorption torque of a working equipment hydraulic pump for driving the working equipment hydraulic actuator, and the absorption torque lowering section is configured to control capacity of the working equipment hydraulic pump in such a manner that a differential pressure for discharge pressure of the working equipment hydraulic pump and load pressure of the working equipment hydraulic actuator becomes a predetermined differential pressure.

BRIEF DESCRIPTION OF THE DRAWINGS

FIG. 4 is a view showing an example of a table for deciding EPC output current.

DETAIL DESCRIPTION OF PREFERRED EMBODIMENTS

First Embodiment

Overall Structure

Figure 1:
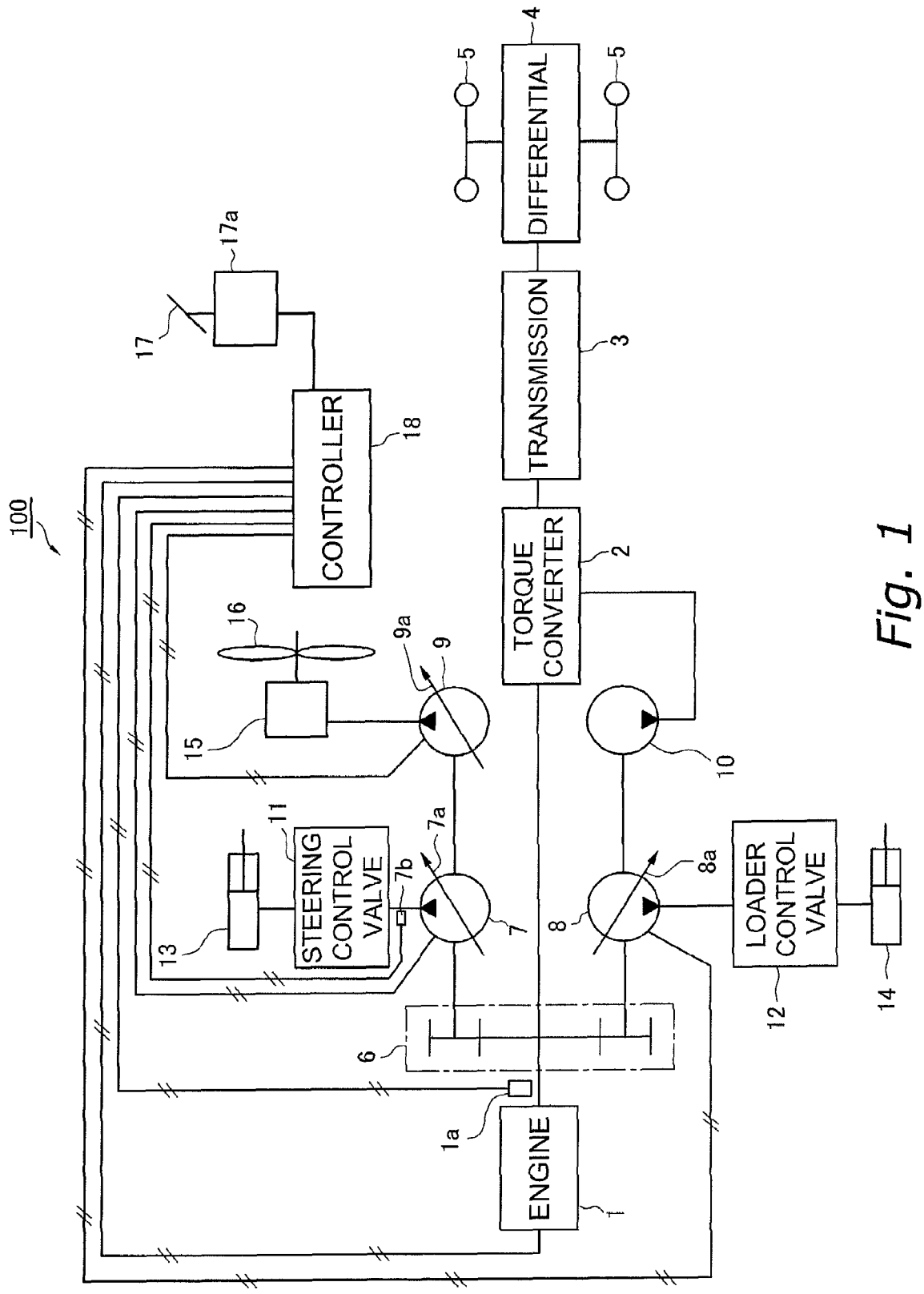
FIG. 1 is a block view of a structure for a working vehicle loaded with a control device of a first embodiment of the present invention.

FIG. 1 is a block diagram showing control of a wheel loader taken as a working vehicle mounted with a control device of a first embodiment of the present invention. As shown in the drawing, a wheel loader 100 is mainly constituted by an engine 1, a travel side mechanism and a working equipment side mechanism driven by the engine 1, and a controller 18 that controls the mechanisms. A PTO (Power Take Off) mechanism 6 constituted by a gear and an axle is provided between the engine and each mechanism.

The engine 1 is a diesel engine and control of output is carried out by regulating the amount of fuel injected to within the cylinder. This adjustment is carried out by controlling a governor fitted to a fuel pump of the engine 1. A governor for a typical oil speed control method can be used as the governor. Namely, the amount of fuel injected is increased or decreased using the governor in such a manner that a difference between a target speed corresponding to the extent of depression of an accelerator pedal 17 and an actual engine speed disappears.

The travel side mechanism has a torque converter 2 inputted with the output of the engine 1, a transmission 3 coupled to the torque converter 2, a differential gear 4 coupled to an output shaft of the transmission 3, and drive wheels 5. The transmission 3 is equipped with a hydraulic clutch for traveling forward, a hydraulic clutch for traveling in reverse, and a number of speed change clutches etc. Switching between going forward or going in reverse and changing speed is carried out by controlling each hydraulic clutch to go on or off.

In addition to the mechanism for the travel system, the wheel loader 100 has a steering mechanism, a loader provided at a front part of the vehicle (both not shown), and a fan 16 as a mechanism driven by the engine 1.

A hydraulic pump and actuator are provided to drive each mechanism. Namely, a steering hydraulic pump 7, a steering control valve 11, and a steering hydraulic cylinder 13 connected to the steering mechanism are provided to drive the steering mechanism. Further, a hydraulic loader pump 8, a loader control valve 12 and a hydraulic loader cylinder 14 connected to the loader are provided to drive the loader. Moreover, a fan hydraulic pump 9 and a fan hydraulic motor 15 are provided to drive a fan 16. Each pump 7, 8 and 9 is coupled to the engine 1 via the PTO mechanism 6. A hydraulic pump 10 for torque lubrication is also provided as a torque converter and this pump is also coupled to the engine 1 via the PTO mechanism 6.

The steering hydraulic pump 7, loader hydraulic pump 8 and fan hydraulic pump 9 are variable capacity hydraulic pumps having swash plates 7a, 8a, 9a. It is then possible to control pump capacity q (cc/rev) by changing a tilt angle of the swash plates 7a, 8a, 9a.

Configuration for Engine Load Control

The wheel loader 100 has an engine speed sensor 1a that detects engine speed in order to control engine load, a stroke sensor 17a that detects an extent of opening of an accelerator pedal 17, a discharge pressure sensor 7b that detects discharge pressure of the steering hydraulic pump 7a, and the controller 18.

The controller 18 is a microcomputer constituted by a CPU, RAM, and ROM etc. As shown in FIG. 1, a sensor output of the engine speed sensor 1a, a sensor output of the stroke sensor 17a of the accelerator pedal 17, and a sensor output of the discharge pressure sensor 7b of the steering hydraulic pump 7a are inputted to the controller 18. The controller 18 then outputs control signals to the engine 1 and each hydraulic pump 7, 8, 9.

Figure 2:
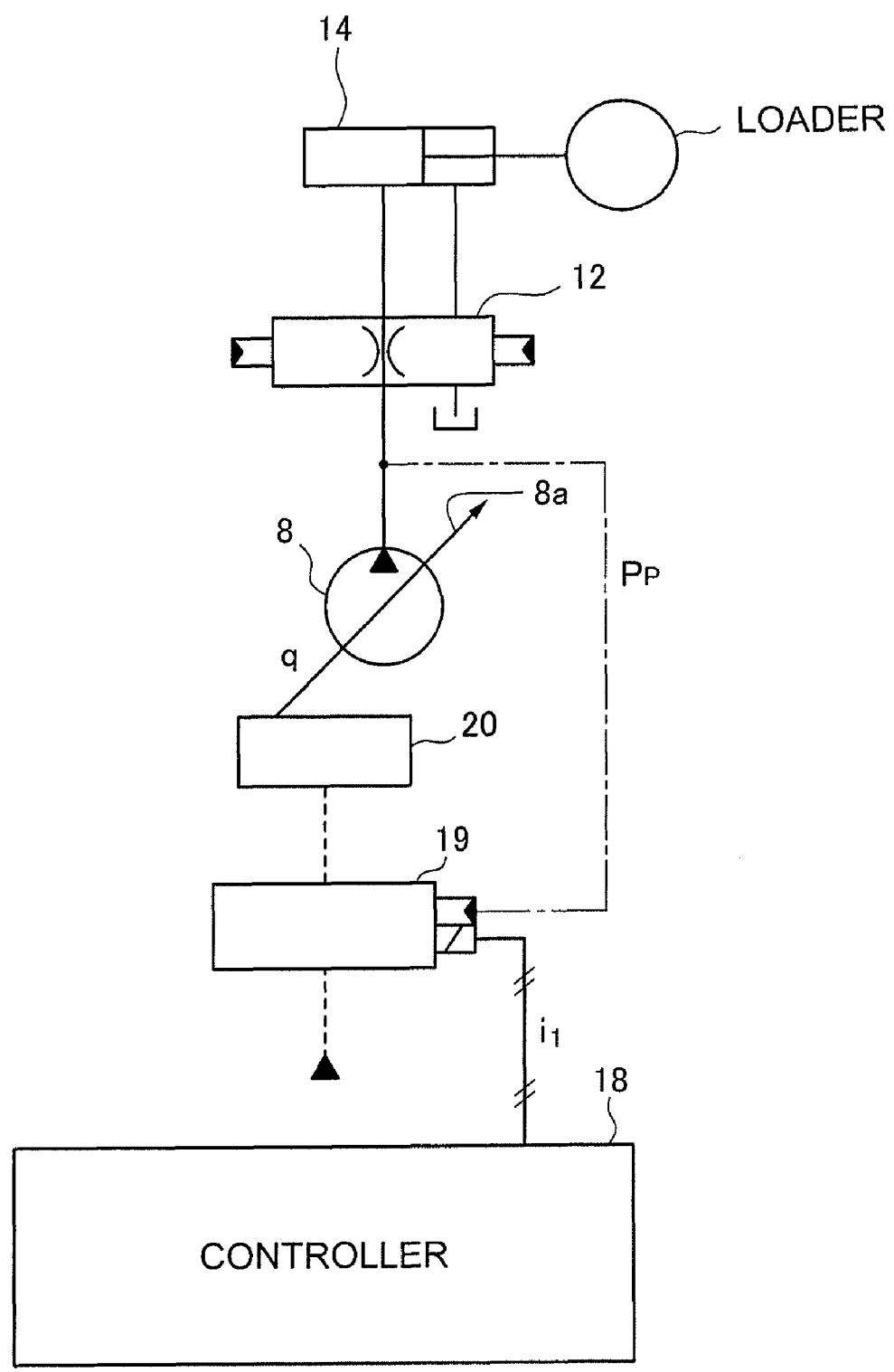
FIG. 2 is a PC control block diagram of a hydraulic loader pump.

FIG. 2 shows a block diagram of control that controls the loader. A structure for controlling the loader hydraulic pump 8 is shown in FIG. 2 but the configuration is the same for the other variable capacity hydraulic pumps 7, 9.

As shown in FIG. 2, a PC valve (horsepower control valve) 19 and servo valve 20 are provided to control the swash plate 8a of the hydraulic pump 8. A discharge pressure Pp (kg/cm$^2$) of the hydraulic pump 8 is inputted as a pilot pressure to the PC valve 19 and a control signal i1 is inputted from the controller 18. Pressurized oil is then supplied from the PC valve 19 to the servo valve 20 so as to control the capacity q of the hydraulic pump 8. The swash plate 8a of the hydraulic pump 8 is then controlled using the PC valve 19 so that the sum of the discharge pressure Pp of the hydraulic pump 8 and the capacity q of the hydraulic pump 8 becomes a fixed torque. If the speed of the engine 1 is then fixed, the swash plate 8a of the hydraulic pump 8 is controlled so that the sum of the discharge pressure Pp of the hydraulic pump 8 and the capacity q of the hydraulic pump 8 does not exceed a fixed horsepower.

Figure 3:
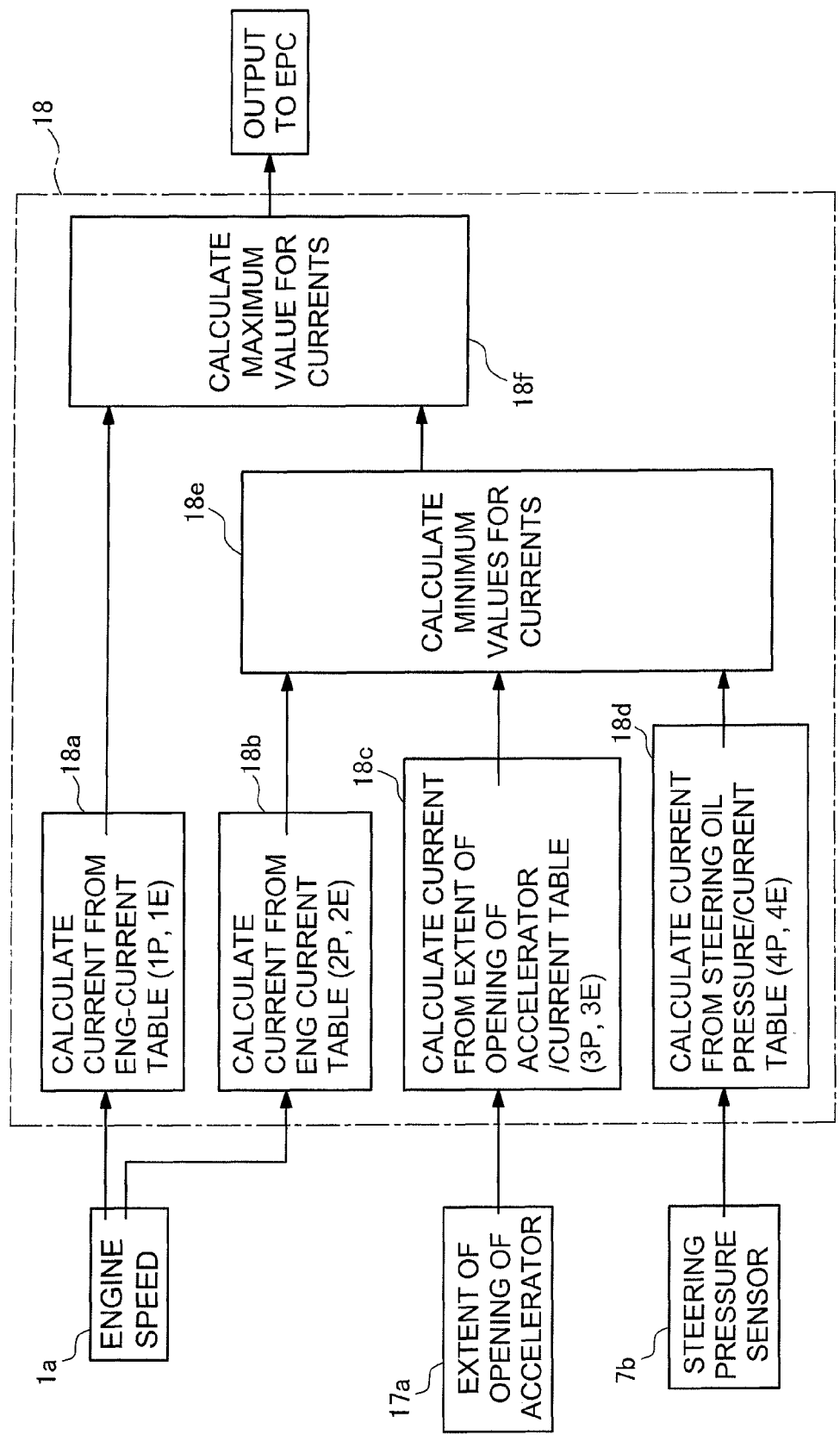
FIG. 3 is a view of a control function of the embodiment.

Next, the function of the controller 18 is shown using a block diagram in FIG. 3. As shown in FIG. 3, the controller 18 has first to sixth arithmetic function units 18a to 18f.

The first arithmetic function unit 18a refers to tables 1P, 1E shown in FIG. 4A and FIG. 4B and decides EPC output current (mA) for implementing improvements to starting and engine stalling prevention functions according to working mode and engine speed. The EPC output current corresponds to a signal i1 outputted to the PC valve 19 from the controller 18 shown in FIG. 2. The tilt angle of the swash plate 8a is smaller for a larger current, with the extent of the pump discharge becoming restricted and the absorption torque of the pump becoming small (the pump capacity becomes smaller). In FIG. 4, "power mode" is a working mode giving priority to output, and "economy mode" is a working mode giving priority to energy saving.

Referring to FIG. 4C and FIG. 4D, the second arithmetic function unit 18b selects EPC output current according to the working mode and the engine speed. Referring to tables 3P and 3E shown in FIG. 4E and FIG. 4F, the EPC output current is selected according to the working mode and the extent of opening of the accelerator (%). The fourth arithmetic function unit 18d then refers to the tables 4P and 4E shown in FIG. 4G and FIG. 4H and selects the EPC output current according to the working mode and the discharge pressure of the steering hydraulic pump 7.

Further, the fifth arithmetic function section 18e then selects the minimum current from EPC output currents selected by the second to fourth arithmetic function units 18b to 18d. Selection of the minimum current at the fifth arithmetic function unit 18e is to ensure working efficiency when the lowering rate for absorption torque of the hydraulic pump 8 is already low, even when considering conditions on the traveling side. The larger current of the current selected by the first arithmetic function unit 18a and the fifth arithmetic function unit 18e is then selected by the sixth arithmetic function unit 18f and outputted to the PC valve 19. Selection of the larger current at the sixth arithmetic function unit 18f is to give priority to avoiding engine stops.

Operation of Each Configuration

The output of the engine 1 is inputted to the transmission 3 via the torque converter 2. At the transmission 3, advancing forward and to the rear is switched over by controlling the forward and reverse travel hydraulic clutches to be on and off. Controlling the change in speed is also achieved by controlling the speed change hydraulic clutch to go on and off. The output of the transmission 3 is transmitted to the drive wheels 5 via the differential gear 4.

On the other hand, the output of the engine 1 is transmitted to each hydraulic pump 7, 8, 9 via the PTO mechanism 6 and each hydraulic pump is driven.

When the steering hydraulic pump 7 is driven, the discharged pressurized oil is supplied to the steering hydraulic cylinder 13 via the steering control valve 11. When pressurized oil is supplied to the steering hydraulic cylinder 13, the steering mechanism operates and the vehicle travels. A spool of the steering control valve 11 moves in response to operation of a steering wheel (not shown). The open surface area of the control valve 11 changes accordingly and the amount of fluid supplied to the steering hydraulic cylinder 13 changes.

Further, when the hydraulic loader cylinder 8 is driven, the discharged compressed oil is supplied to the loader hydraulic cylinder 14 via the loader control valve 12. The loader then operates when compressed oil is supplied to the loader hydraulic cylinder 14. Namely, a boom constituting the loader rises or falls and the bucket is tilted. The spool of the loader control valve 12 is moved according to the operation of a loader operation lever (not shown), the open surface area of the control valve 12 is changed accordingly and the amount of fluid supplied to the loader hydraulic cylinder 14 is changed.

When the fan hydraulic pump 9 is driven, the discharged pressurized oil is supplied to the fan hydraulic motor 15 and the cooling fan 16 operates.

When the torque lubrication hydraulic pump 10 is driven, the discharged pressurized oil is supplied to the torque converter 2 and the torque converter 2 is lubricated.

Engine Control

Figure 5:
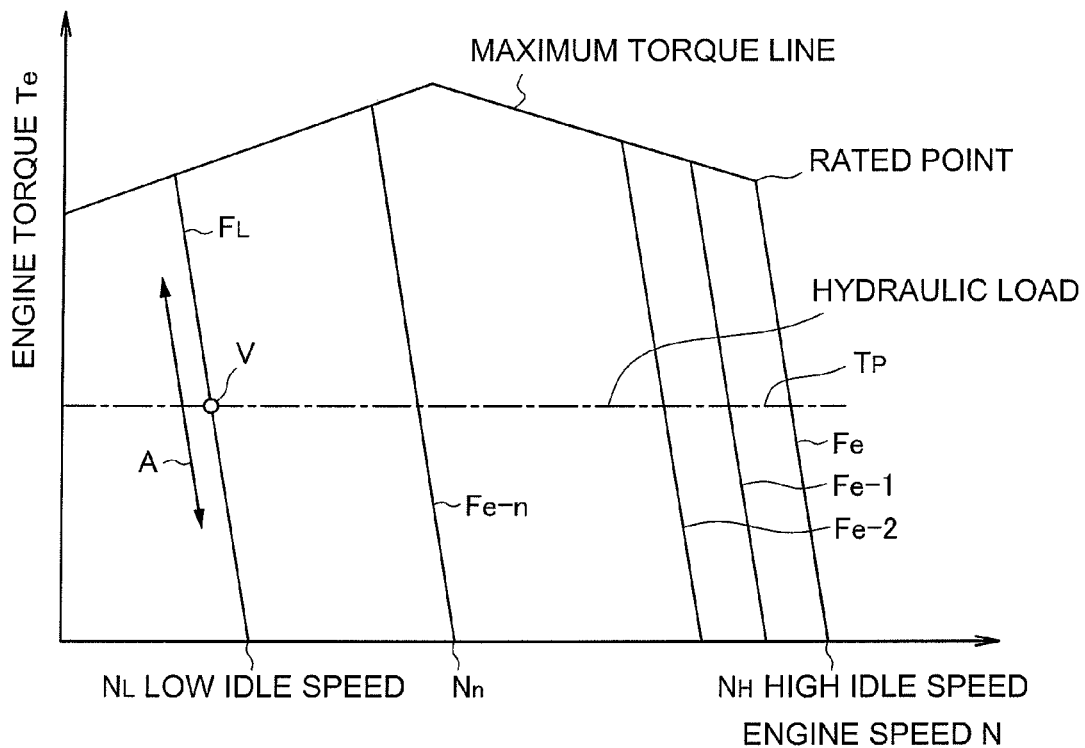
FIG. 5 is a view showing a relationship between engine speed and engine torque.

Next, a description is given of engine control by the accelerator pedal 17. FIG. 5 shows a relationship between engine speed N, engine torque Te, and hydraulic load. In FIG. 5, a region defined by a maximum torque line indicates attained output performance for the engine 1. The engine 1 is controlled by the governor so that engine torque does not exceed a maximum torque line over an exhaust smoke boundary and does not go over a speed where the engine speed N exceeds the high idle speed $N_H$.

For example, when the accelerator pedal 17 is depressed as far as possible, the maximum target speed is set by the controller 18. The governor then carries out speed control on a high-speed regulation line Fe linking a rated point and a high-idle point $N_H$. The regulation lines Fe-1, Fe-2, ... Fe-n ... $F_L$ are sequentially decided in accordance with the extent of depression of the accelerator pedal 17 becoming smaller and speed control is carried out on each regulation line.

When the extent of depression of the accelerator pedal 17 is a minimum, i.e. when there is no depression, the low idle speed $N_L$ is set as the target speed and speed control is carried out on the regulation line $F_L$ linking with the low idle point $N_L$. At this time, when the hydraulic load $T_p$ fluctuates as shown by arrow A, a matching point V where the output of the engine 1 and pump absorption horsepower even out moves on the regulation line in accordance with this fluctuation.

Figure 6:
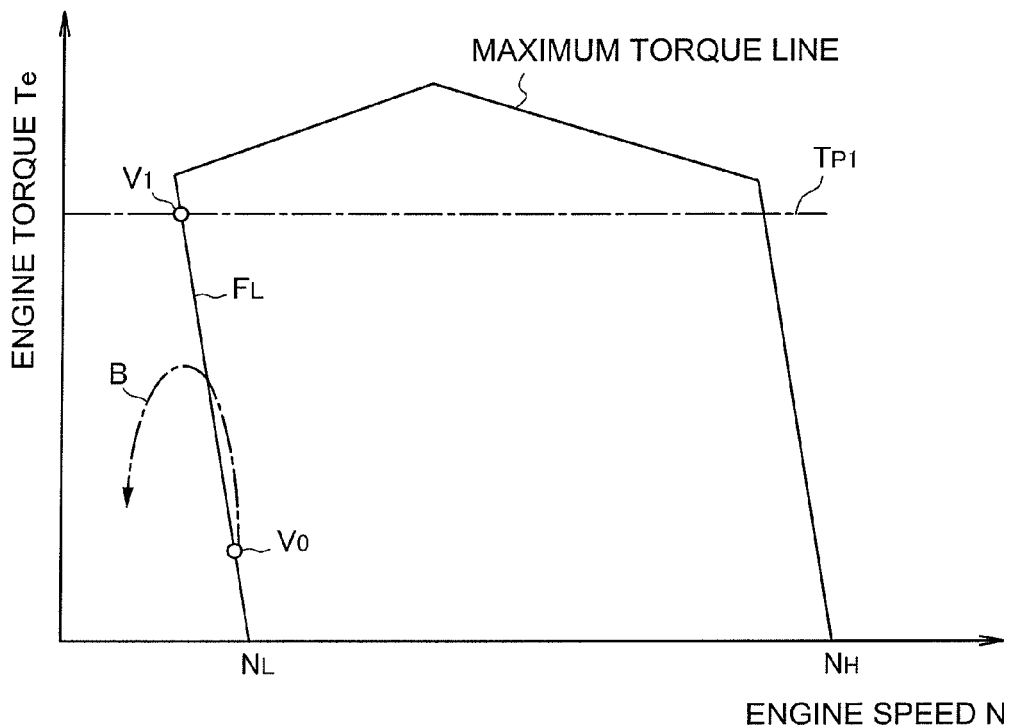
FIG. 6 is a further view showing a relationship between engine speed and engine torque.

A feature of the engine 1 is that the time for the matching point to move from a low load to a high load on the regulation line is longer for low speed ranges (low idle speed NL) than for high speed ranges (high idle speed NH). Engine response of the engine 1 is therefore poorer for low speed ranges than for high speed ranges. Because of this, with conventional devices there are cases where the engine stops such as shown in B of FIG. 6. This is caused by an inability to keep pace with a rise in engine torque when it is necessary for the engine torque to rise as far as the matching point V1 (refer to FIG. 6) when the high hydraulic load $T_{p1}$, is applied suddenly when the hydraulic load is low and there is matching with the matching point V0.

Even if the accelerator pedal 17 is pressed down with a high hydraulic load applied on the working equipment side, the response is poor with it taking time for the engine speed to rise and this is stressful for the operator.

Engine Load Control

In this embodiment, in addition to engine speed and the intent of the operator in the form of the extent to which the accelerator is open, information for steering hydraulics is also inputted to the controller 18. Control is then implemented to reduce absorption torque of the loader hydraulic pump 8 based on this information. The following is a description of this control using the flowchart shown in FIG. 7, etc.

Figure 7:
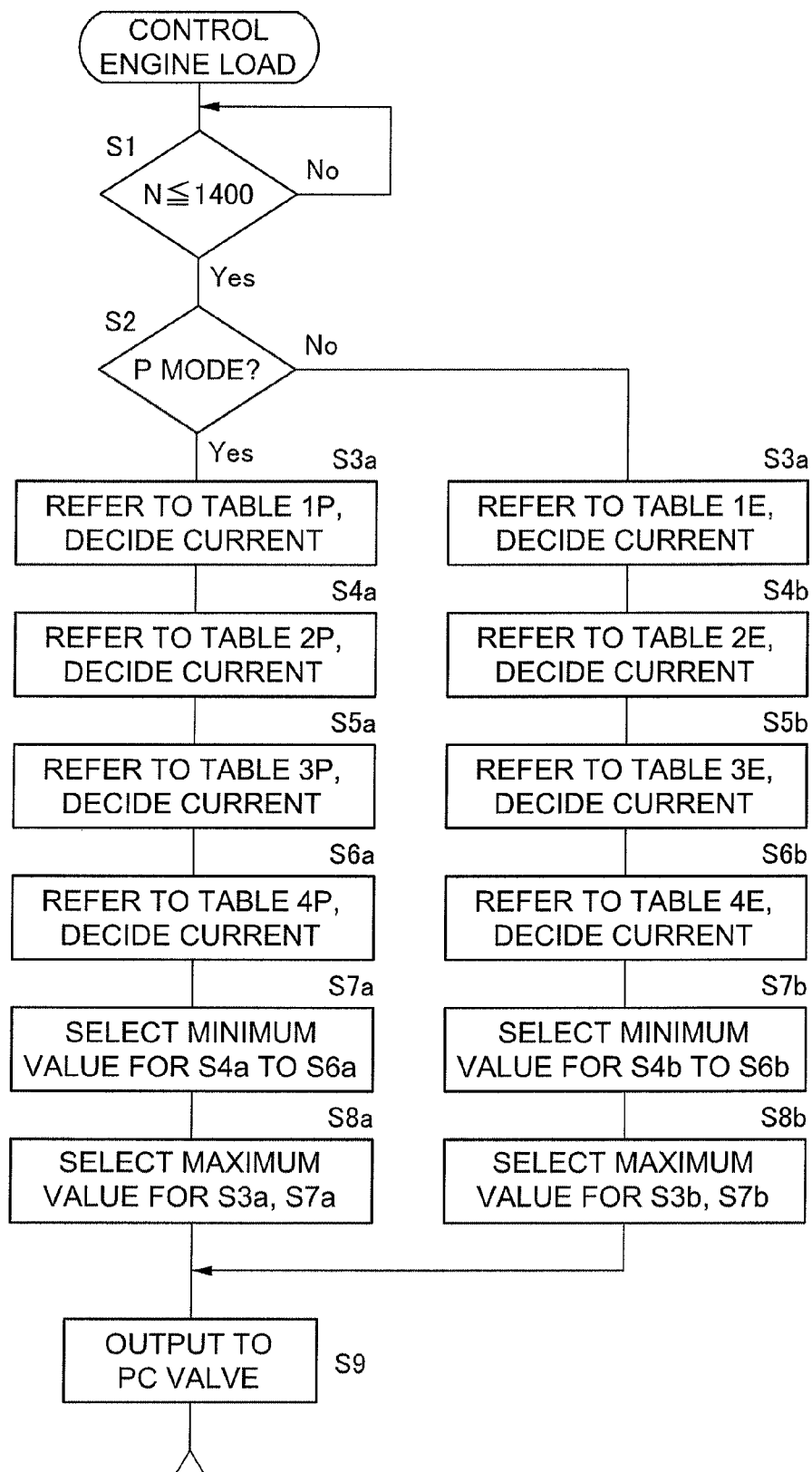
FIG. 7 is a control flowchart.

First, in step S1 of FIG. 7, it is determined whether or not engine speed is 1400 rpm or less. When the engine speed exceeds 1400 rpm, the likelihood of the engine stopping is low. The poorness of the response with respect to depression of the accelerator pedal 17 is also not noticeable and this control is not executed.

When the engine speed is 1400 rpm or less, step S2 is proceeded to from step S1. In step S2, it is determined whether or not the working mode is set to the power mode. When set to the power mode, step S3a is proceeded to from step S2. When the economy mode is set, step S3b is proceeded to from step S2.

Table 1P is then referred to in step S3a and EPC output current (first fall rate) is decided for the engine speed. Current values are only set for "800 rpm", "880 rpm", "900 rpm", "920 rpm", and "930 rpm" in the table 1P but current values between these speeds can be obtained by carrying out data interpolation. Interpolation between each item of data is the same for the following processing.

Next, in step S4a, EPC output current (second fall rate) is decided for the engine speed by referring to the table 2P. In step S5a, the table 3P is referred to and the EPC output current (third fall rate) for the extent of pressing down of the accelerator is decided with reference to the table 3P. In step S6a, the EPC output current (fourth fall rate) is decided for the steering hydraulics with reference to the table 4P. The currents decided in each step are then temporarily accumulated in a buffer etc. Next, in step S7a, a minimum value among the currents decided in each of the steps S4a to 6a is selected. Namely, as described above, the minimum current is selected so that the extent of decrease in pump capacity is kept to a minimum.

Next, in step S8a, the largest current is selected from the current decided in step S3a and the current selected in step S7a. This is to give the highest priority to preventing stopping of the engine.

The processing of steps S3b to step S8b are executed in the case of economy mode. The processing of steps S3b to S8b are the same as for power mode with the exception that the tables referred to are tables 1E to 4E rather than tables 1P to 4P.

The control signal i1 corresponding to the obtained current is outputted to the PC valve 19 in step S9.

As a result of the above control, the steering mechanism does not become inoperable within a range where the engine does not stop and the loader hydraulic pump 8 is controlled while also taking into consideration the extent of depression of the accelerator pedal 17 (the intent of the operator). Specifically, the loader hydraulic pump 8 can reduce absorption torque at the lowest falling rate while taking into consideration each of the above conditions.

Absorption Torque Control Operation

A detailed description of the operation where the absorption torque of the loader hydraulic pump 8 falls as a result of the above control is described in detail in the following.

The PC valve 19 controls the capacity q of the hydraulic pump 8 by taking the discharge pressure Pp of the hydraulic pump 8 as input as pilot pressure and supplying pressurized oil for driving to the servo valve 20 in response to the discharge pressure Pp.

Figure 8:
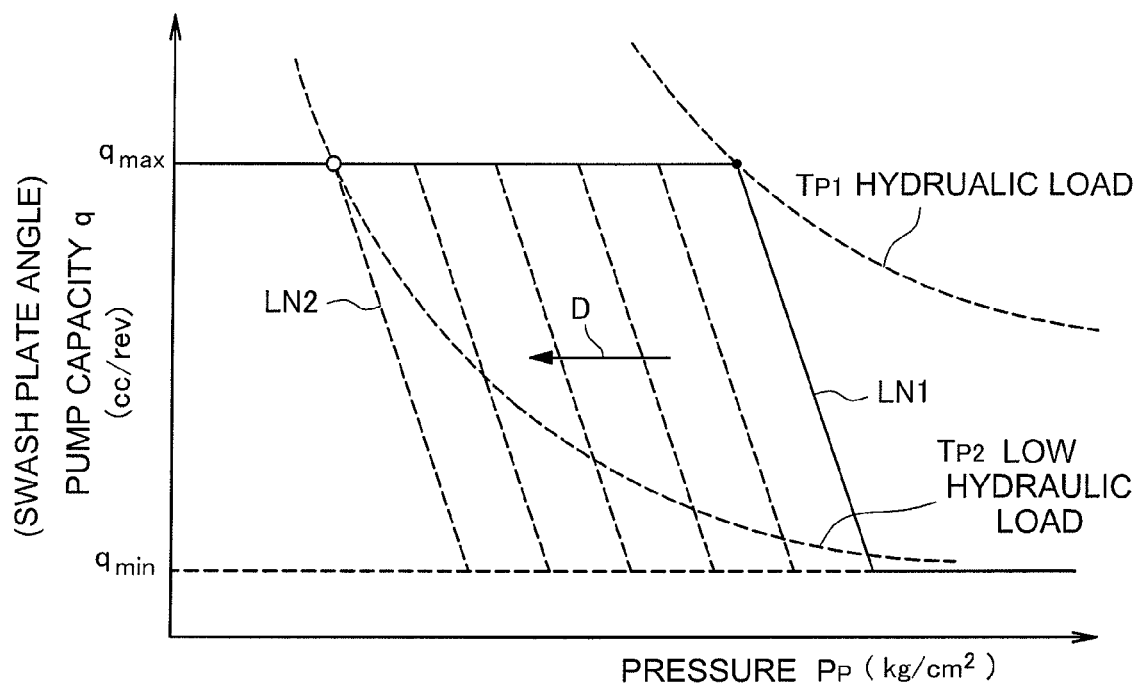
FIG. 8 is a view illustrating control that changes maximum absorption torque of a hydraulic oil pump.

The relationship between the discharge pressure Pp and the capacity q (=tilt angle of the swash plate 8a) of the hydraulic pump 8 is shown in FIG. 8. As shown in FIG. 8, if the discharge pressure Pp of the hydraulic pump 8 is a fixed pressure or less, the tile angle of the swash plate 8a of the hydraulic pump 8 is set to a maximum and the hydraulic pump 8 is at maximum capacity qmax. When the hydraulic load becomes large and the pump discharge pressure Pp exceeds a fixed pressure, the pump capacity q is reduced in accordance with the characteristic LN1 so that the swash plate tilt angle becomes a minimum, and the pump capacity is made the minimum capacity qmin.

The pump capacity q at the hydraulic pump 8 is therefore controlled according to the pump discharge pressure Pp so that the hydraulic load, i.e. the absorption torque is in a range where the maximum absorption torque Tp1 is not exceeded.

The control signal i1 from the controller 18 is then inputted to the PC valve 19 as a result of the above control processing and the maximum absorption torque is controlled according to this control signal i1. As shown by the arrow D in FIG. 8, as the current (current obtained in the control processing of FIG. 7) supplied to the PC valve 19 using the control signal i1 becomes higher, the characteristic changes from characteristic LN1 to characteristic LN2. The value for pump discharge pressure upon starting reduction of the pump capacity is therefore small and the maximum absorption torque value is set to a small value of Tp2.

The absorption torque of the loader hydraulic pump 8 can be set to be small using the minimum fall rate by providing the current obtained using the control processing of FIG. 7 to the PC valve 19 while referring to the engine speed, extent of accelerator depression and referring to the steering oil pressure. It is therefore possible to prevent the engine from stopping, suppress deterioration in response to depression of the accelerator pedal 17 and cause the loader to function effectively.

Second Embodiment

In the above embodiment, the loader hydraulic pump 8 is controlled as a result of PC control by the PC 19 but control using LS control using an LS valve (load sensing valve) is also possible. The following is a description of an embodiment for the case of carrying out LS control.

LS Control

Figure 9:
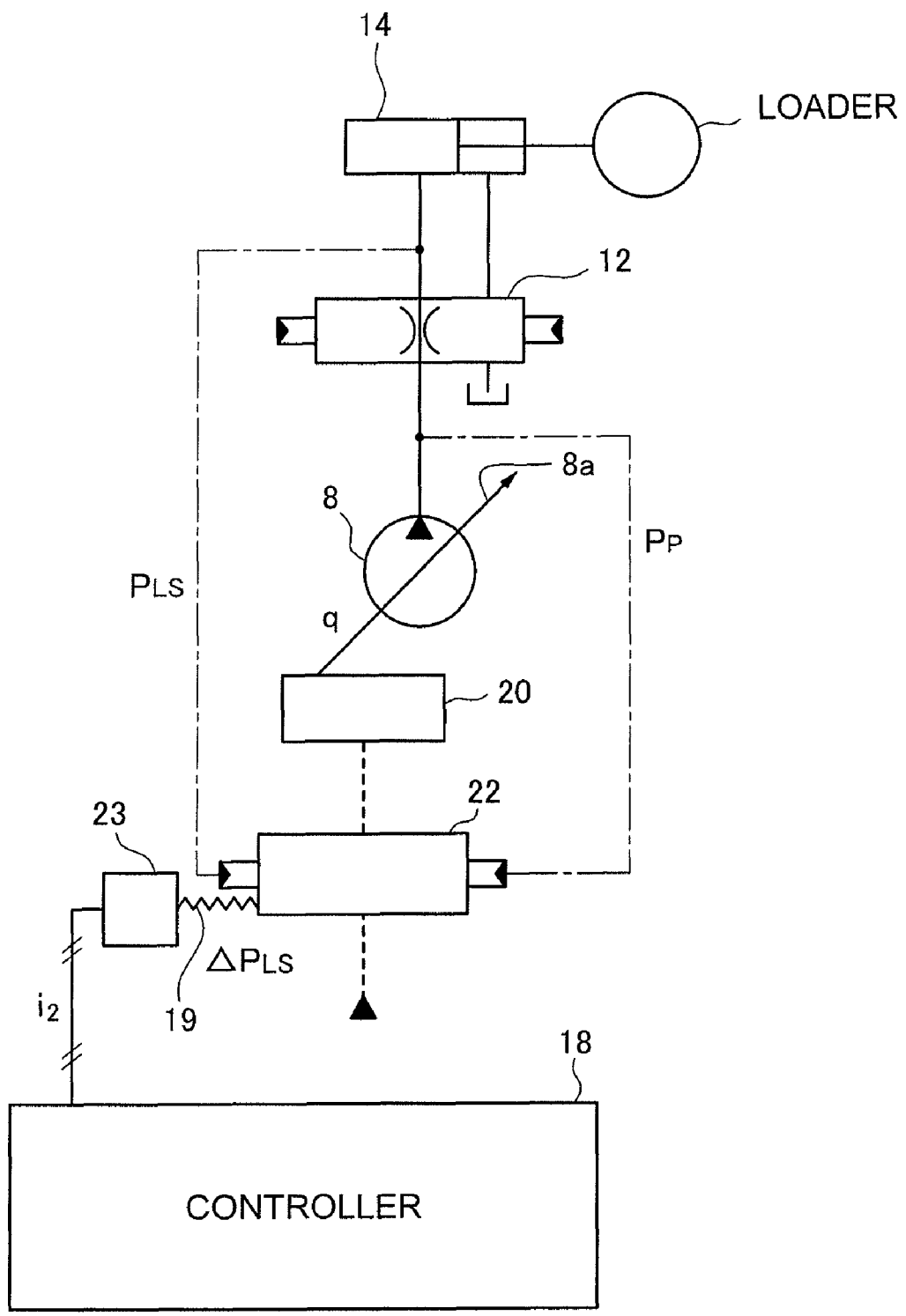
FIG. 9 is a block diagram of LS control for a hydraulic loader pump.

FIG. 9 shows a configuration for subjecting the loader hydraulic pump 8 to LS control and is a structure corresponding to FIG. 2 of the above embodiment. Here, an LS valve 22 and a differential pressure setting unit 23 are provided in place of the PC valve 19 of the above embodiment.

The LS valve 22 controls tilt angle of the swash plate 8a of the hydraulic pump 8 so that a pressure differential ΔP between the discharge pressure Pp of the hydraulic pump 8 and a load pressure PLS of the loader hydraulic cylinder 14 becomes a fixed differential pressure ΔPLS. Namely, a spring for setting the fixed differential pressure ΔPLS is provided at the LS valve 22. The discharge pressure Pp of the hydraulic pump 8 is applied as a pilot pressure to a pilot port on the opposite side to the spring side of the LS valve 22 and a load pressure PLS of the loader hydraulic cylinder 14 is applied as the pilot pressure. Further, the capacity q of the hydraulic pump 8 is controlled by supplying pressurized oil for driving from the LS valve 22 to the servo valve 20.

When the open surface area of the loader control valve 12 is taken to be A, and the resistance coefficient is taken to be c, the discharge amount Q of the hydraulic pump 8 is denoted by:

$$Q = c \cdot A \cdot \sqrt{(\Delta P)}$$

The pressure differential ΔP is fixed using the LS valve 22. The pump capacity Q is therefore changed only by the open surface area A of the spool of the control valve 12.

The specific operation is as follows. When the loader operation lever is operated, the open surface area A of the loader control valve 12 is increased according to the extent of this operation. The pumping rate Q is then increased in response to the increase in the open surface area A. At this time, the pumping rate Q is then only decided by the extent of operation of the loader operation lever and is not influenced by the hydraulic load. As a result of providing the LS valve 22, the pumping rate Q changes in the manner intended by the operator (according to the operation position of the loader operation lever) without increasing or decreasing as a result of the hydraulic load.

However, at the time of fine-control etc., it is necessary to supply a flow rate that is as normally required by the loader hydraulic cylinder 14 even in cases where the maximum flow rate of the hydraulic pump 8 is not exceeded. The discharge rate is therefore the same as for high speed regions even when the engine 1 is in a low speed region.

This Embodiment

It is also possible to lower the differential pressure setting value ΔPLS and execute control to suppress the discharge rate in the second embodiment also using a control signal i2 from the controller 18 obtained using the same processing (processing of FIG. 7) as for the first embodiment. Specifically, the differential pressure setting unit 23 is provided for changing the setting spring force of the spring at the LS valve 22. When a control signal i2 is provided to the differential pressure setting unit 23 from the controller 18, the differential pressure setting unit 23 changes the setting spring force of the spring for the LS valve 22 and changes the differential setting value ΔPLS.

Figure 10:
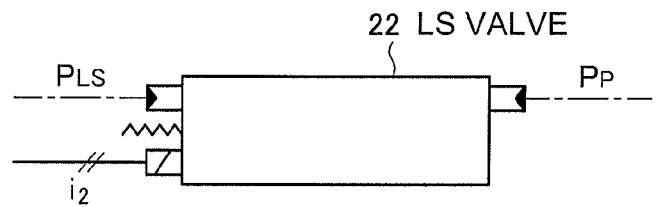
FIG. 10 is a view showing part of a further embodiment for LS control.

As shown in FIG. 10, it is also possible for the setting spring force of the spring of the LS valve 22 to be changed by providing the control signal i2 to an electromagnetic solenoid of the LS valve 22 so that the differential pressure setting value ΔPLS is changed.

Differential Setting Value Change Control

Figure 11:
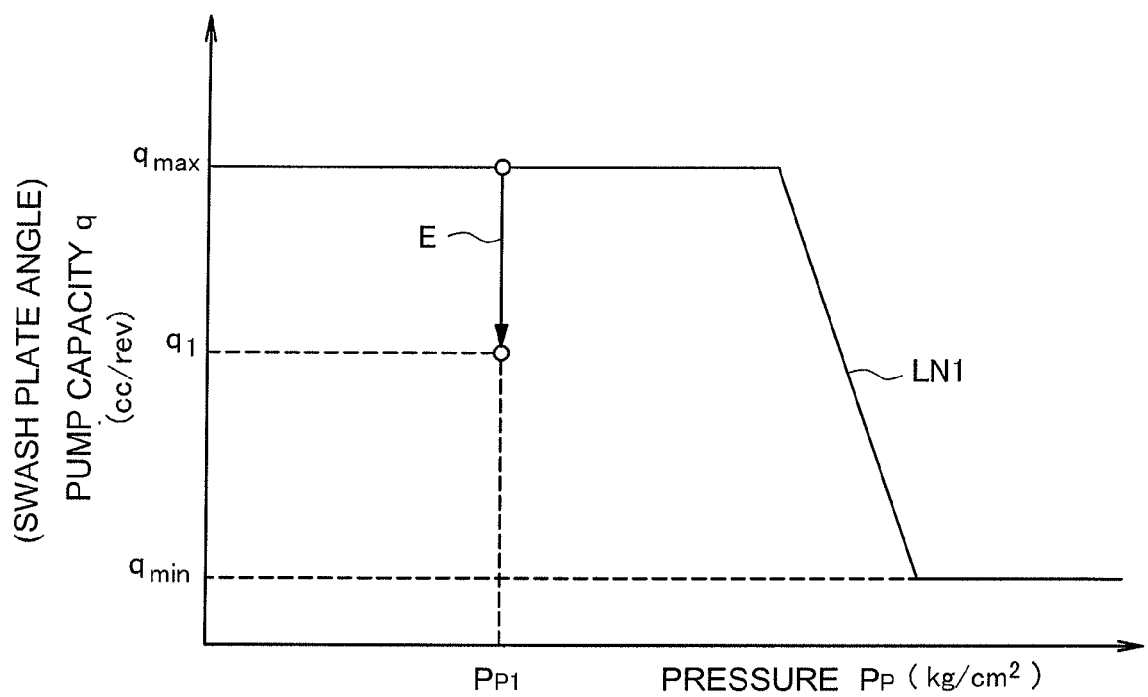
FIG. 11 is a view illustrating control that changes capacity of a hydraulic oil pump.

A description is given of control for changing the differential setting value as described above using FIG. 11. FIG. 11 is a view showing the relationship between the discharge pressure Pp and the capacity q (=tilt angle of the swash plate 8a) of the hydraulic pump 8.

As shown in FIG. 11, the discharge pressure Pp of the hydraulic pump 8 is $P_{p1}$. When the pumping rate q at this time becomes the maximum value qmax, when the differential setting value ΔPLS changes to a small value. This corresponds to the right side of the above equation ($Q = c \cdot A \cdot \sqrt{(\Delta P)}$) becoming small. As a result, as shown by the arrow E in FIG. 11, the pumping rate q is changed from the maximum value qmax to a small value q1. The absorption torque of the hydraulic pump 8 i.e. the hydraulic load is then made small by making the pumping rate q small.

The absorption torque of the loader hydraulic pump 8 can be set to be small using the minimum fall rate by using the control described above and referring to the engine speed, extent of accelerator depression and referring to the steering oil pressure as in the first embodiment. It is therefore possible to prevent the engine from stopping, suppress deterioration in response to depression of the accelerator pedal 17 and cause the loader to function effectively.

Further Embodiment

In each of the above embodiments, engine speed, accelerator pedal stroke (extent of opening of the accelerator) and discharge pressure of the steering hydraulic pump are detected and the absorption torque of the loader hydraulic pump is controlled based on this information. However, the information for this control is not limited to the information from this equipment.

For example, this is by no means limited to an accelerator pedal, and an accelerator lever etc. is also possible for giving the intent of the operator providing that the speed is instructed by the operator. Further, it is also possible to detect discharge pressure of a hydraulic pump driving other equipment rather than discharge pressure of the steering hydraulic pump or alternatively the discharge pressure of a hydraulic pump for other equipment can be detected in addition to the discharge pressure of the steering hydraulic pump.

(b) An example is given in the above embodiments of a loader hydraulic pump as a hydraulic pump to be controlled but control of absorption torque of hydraulic pumps for other working equipment is also possible.

(c) The configuration for controlling absorption torque of the hydraulic pump is not limited to PC control and LS control and reducing of absorption torque using other control is also possible.

The present invention is capable of carrying out engine load control in an appropriate balanced manner taking engine load of the vehicle as a whole into consideration.

The invention claimed is:

1. An engine load control device for a working vehicle in which output of an engine is transmitted to drive wheels and to a plurality of hydraulic actuators including a working equipment hydraulic actuator via a plurality of variable capacity hydraulic pumps with an engine speed being controlled by a speed instruction device, the engine load control device comprising:
    an engine speed detection unit configured and arranged to detect the engine speed;
    an instruction contents detection unit configured and arranged to detect contents of instructions of the speed instruction device;
    a hydraulic pump load detection unit configured and arranged to detect load of at least one load detection hydraulic pump of among the variable capacity hydraulic pumps; and
    an absorption torque control unit configured to control absorption torque of at least one control hydraulic pump among the variable capacity hydraulic pumps other than the load detection hydraulic pump based on detection results of the engine speed detection unit, the instruction contents detection unit, and the hydraulic pump load detection unit,
    the absorption torque control section including
        a first fall rate determining section configured to determine a first fall rate for lowering the absorption torque of the control hydraulic pump so that the engine speed does not become equal to or less than a second engine speed that is equal to or less than a prescribed low idle speed set for preventing the engine from stopping,
        a second fall rate determining section configured to determine a second fall rate for lowering the absorption torque of the control hydraulic pump according to the engine speed, a third fall rate determining section configured to determine a third fall rate for lowering the absorption torque of the control hydraulic pump according to the contents of the instructions for the engine speed, a fourth fall rate determining section configured to determine a fourth fall rate for lowering the absorption torque of the control hydraulic pump according to the load of the load detection hydraulic pump, a minimum fall rate selecting section configured to select a minimum fall rate among the second, third and fourth fall rates, a maximum fall rate selecting section configured to select a largest fall rate between the first fall rate and the minimum fall rate, and an absorption torque lowering section configured to lower the absorption torque of the control hydraulic pump according to the fall rate selected by the maximum fall rate selecting section.

2. The engine load control device for a working vehicle according to claim 1, wherein
the absorption torque control unit is further configured to execute control processing for controlling the absorption torque of the control hydraulic pump when the engine speed is at a first engine speed or less.

3. The engine load control device for a working vehicle according to claim 1, wherein
the absorption torque control unit is further configured to control absorption torque of a working equipment hydraulic pump for driving the working equipment hydraulic actuator.

4. The engine load control device for a working vehicle according to claim 1, wherein
the hydraulic pump load detection unit is further configured to detect discharge pressure of a steering hydraulic pump for driving a steering hydraulic actuator included in a steering mechanism.

5. The engine load control device for a working vehicle according to claim 1, wherein
the instruction content detection unit is further configured to detect an opening degree of an accelerator device.

6. The engine load control device for a working vehicle according to claim 1, further comprising
a working mode determining unit configured to determine whether a working mode is set to a power mode giving priority to generating power or an economy mode giving priority to conservation of energy,
the absorption torque control unit being further configured to control the fall rate of the absorption torque of the control hydraulic pump according to the working mode.

7. The engine load control device for a working vehicle according to claim 1, wherein
the absorption torque control unit is further configured to control absorption torque of a working equipment hydraulic pump for driving the working equipment hydraulic actuator, and
the absorption torque lowering section is further configured to control maximum absorption torque of the working equipment hydraulic pump.

8. The engine load control device for a working vehicle according to claim 1, wherein
the absorption torque control unit is further configured to control absorption torque of a working equipment hydraulic pump for driving the working equipment hydraulic actuator, and
the absorption torque lowering section is further configured to control capacity of the working equipment hydraulic pump so that a pressure differential of discharge pressure of the working equipment hydraulic pump and load pressure of the working equipment hydraulic actuator becomes a predetermined pressure differential.

* * * * *